Mar. 6, 1923.

G. L. ZUCKER.
ELASTIC HINGE FOR RUBBER OVERSHOES.
FILED JULY 28, 1922.

1,447,586.

Patented Mar. 6, 1923.

1,447,586

UNITED STATES PATENT OFFICE.

GEORGE L. ZUCKER, OF EAST ORANGE, NEW JERSEY.

ELASTIC HINGE FOR RUBBER OVERSHOES.

Application filed July 28, 1922. Serial No. 578,238.

*To all whom it may concern:*

Be it known that I, GEORGE L. ZUCKER, a citizen of the United States, residing at East Orange, in the county of Essex and State of New Jersey, have invented certain new and useful Improvements in Elastic Hinges for Rubber Overshoes, of which the following is a specification.

My invention relates to an improvement in elastic hinge for rubber overshoes.

Hitherto a V-shaped portion of the rubber has been removed from the edge of a rubber shoe and as a result strain on the fabric of the overshoe due to pulling rubber overshoe in applying or removing as well as various strains while wearing are confined to but one or two threads of the fabric thereby limiting the life of the rubber over shoe.

The object of my invention is to obviate this objection and provide a rubber overshoe with an elastic hinge at one or more points in the upper edge where the strain comes in applying or removing the overshoe and in wearing the same and this is done by slitting the overshoe from the edge in and providing an enlarged perforation at the inner end of the slit whereby the strain is distributed over a much larger area and number of threads of the fabric of the overshoe instead of concentrating at one fixed point, an elastic patch is folded over the edge and secured astride thereto covering the slit and hole.

A represents a rubber overshoe and the numeral 1 indicates a slit cut through the upper edge of the overshoe and 2 is an enlarged hole or perforation at the inner end of the slit which is of sufficient size to distribute the pulling or strain and prevent its concentration at a single point as would be the case if the notch were V-shaped.

An elastic patch 3 is folded over the edge of the overshoe and secured on both sides thereof by some adhesive substance covering and enclosing both slit and hole as viewed in the different figures of the drawings.

Figure 1:
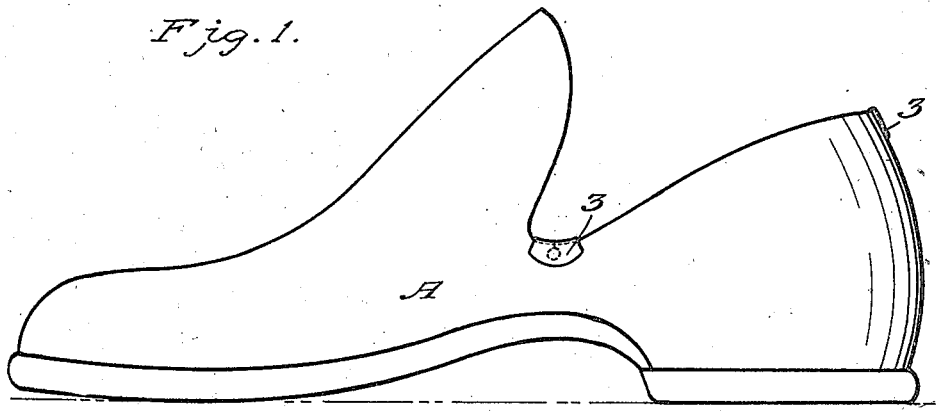
Figure 1 is a view of a rubber overshoe in side elevation.
Figure 2:
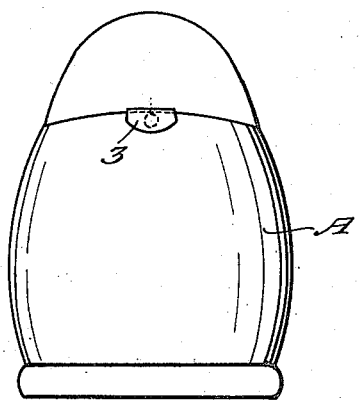
Fig. 2 is a rear view.
Figure 3:
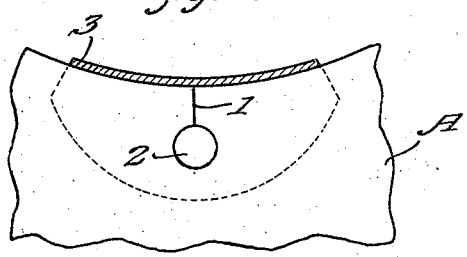
Fig. 3 is an enlarged fragmentary detail.
Figure 4:
Fig. 4 is a view of one form of the elastic patch reduced in size.

Obviously any number of these hinges might be employed. Generally it is advantageous to put one on either side at the angle as shown in Fig. 1 and one at the back of the shoe as shown in Fig. 2. As many more might be employed as considered desirable.

In this way the required go and come of the elastic is provided along the portion of the edge where elasticity is desired. This makes it possible to provide a rubber overshoe that always snugly fits the shoe over which it is placed and at the same time reduces the difficulty ordinarily experienced in removing a tight rubber overshoe.

Likewise by the use of this improved patch the overshoe to which it is applied is not weakened and is really reinforced while rendered elastic. Not only may the number of these be varied and the point of application be changed to suit the requirements but also the shape of the patch and the hole at the end of the slit may be varied, the really essential feature being a slit in the edge with an engagement at the end carried by an elastic patch.

I claim:

1. A device of the character described including an overshoe having a slit edge, with an enlarged hole at the inner end of the slit and an elastic patch folded over the edge of the overshoe covering and enclosing the slit and enlargement and made to adhere to opposite sides of the edge.

2. The combination with an overshoe having a slit edge with an enlarged hole at the inner end of the slit, of an elastic patch folded over the slit portion of the edge of the overshoe and made to adhere to opposite surfaces thereof and to enclose the slit and enlarged opening.

In testimony whereof I affix my signature.

GEORGE L. ZUCKER.